United States Patent [19]

Miyashita et al.

[11] Patent Number: 4,551,010

[45] Date of Patent: Nov. 5, 1985

[54] ORIGINAL CONVEYING APPARATUS FOR ELECTROPHOTOGRAPHIC COPYING MACHINES

[75] Inventors: Kiyoshi Miyashita, Hachioji; Fumitaka Ozeki, Inagi; Hiroshi Tsuda, Mitaka, all of Japan

[73] Assignee: Olympus Optical Co., Ltd., Tokyo, Japan

[21] Appl. No.: 176,262

[22] Filed: Aug. 8, 1980

[30] Foreign Application Priority Data

Oct. 23, 1979 [JP] Japan ................................ 54-136733

[51] Int. Cl.[4] ........................ G03B 27/32; G03B 27/52

[52] U.S. Cl. .......................................... 355/25; 355/75

[58] Field of Search ........................ 355/25, 75; 352/79

[56] References Cited

U.S. PATENT DOCUMENTS

| | | | |
|---|---|---|---|
| 3,439,980 | 4/1969 | Teshi et al. | 352/79 |
| 3,588,244 | 6/1971 | Murgas | 355/25 |
| 3,597,074 | 8/1971 | Murgas | 355/25 |
| 3,695,754 | 10/1972 | Washio . | |

FOREIGN PATENT DOCUMENTS 1522161 3/1976 Fed. Rep. of Germany .

*Primary Examiner*—Monroe H. Hayes

*Attorney, Agent, or Firm*—Louis Weinstein

[57] ABSTRACT

An original conveying apparatus includes a follower roller unit which is moved to its deployed position to define an extension of an original conveying path over the upper surface of the copying machine when a book carrier is used in order to convey an original having substantial thickness. A follower roller holding member is disposed within the unit and moves in interlocked relationship with the movement of the unit to its deployed position so as to maintain the follower roller in its position projecting above an original guide surface when the unit is moved to its deployed position.

8 Claims, 5 Drawing Figures

ORIGINAL CONVEYING APPARATUS FOR ELECTROPHOTOGRAPHIC COPYING MACHINES

BACKGROUND OF THE INVENTION

The invention relates to an original conveying apparatus for an electrophotographic copying machine, and more particularly, to such apparatus for conveying an original having substantial thickness which is used in the electrophotographic copying machine of the type capable of carrying, not only a sheet-shaped, thin original, but also an original having substantial thickness, such as a book, to an exposure station for copying purpose, with a book carrier being utilized to convey the thick original.

As is well recognized, a conventional electrophotographic copying machine of the type in which an original is fed through an exposure station for copying purpose is constructed as illustrated in FIG. 1, for example. The machine is provided with an original feed path which is normally conditioned to enable copying from a single sheet-shaped original, as shown. In the condition shown, a sheet-shaped original 1 is placed on an inclined original receptable 2, and is inserted into the inlet of an original conveyor unit which includes pairs of conveyor rollers 4A, 4B and 5A, 5B and a pair of guide plates 6, 7. After passing through the inlet, the original 1 is fed into the nip between the pairs of vertically spaced conveyor rollers 4A,4B to be fed toward and through an exposure station 8 while passing between the guide plates 6, 7 and between the guide plate 6 and the exposure station 8. After passing through the exposure station 8, the original is fed into the nip between the other pair of vertically spaced conveyor rollers 5A, 5B to be delivered onto an original tray 9.

As the original 1 is fed by the original conveyor unit, a pair of microswitches 3A, 3B, located adjacent to the rollers 4A, 4B, detect the position of the original 1, and the timing of operation of the various parts of the electrophotographic copying machine is controlled based upon this detection. As the original 1 passes through the exposure station 8, an illumination lamp 10 illuminates the surface of the original, whereupon an exposure optical system 11 projects an image of the original onto a photosensitive drum 12. The drum 12 rotates in a direction indicated by an arrow B. Any electric charge is initially removed from the drum surface by means of a neutralizer lamp 13, and then the drum surface is uniformly charged by means of a corona charger 14. Then the drum surface is irradiated with the light image of the original to have an electrostatic latent image of the original 1 formed thereon. The latent image is developed by a developing unit 15 of dry type to form a toner image, which is moved to a transfer station 16 as the drum 12 rotates.

On the other hand, a record sheet 18 is fed one by one from its stack contained in a cassette 17 by means of a rocking and rotating feed roller 19, and is fed to the transfer station 16 by a pair of vertically spaced feed rollers 20 in timed relationship with the rotation of the drum so that the record sheet is superimposed on the toner image on the drum surface. Thereafter, the record sheet is conveyed between the drum 12 and a transfer roller 21 to which a bias voltage is applied. Such process transfers the toner image onto the record sheet. Since the record sheet is conveyed in firm contact against the drum surface during the process, the sheet must be separated from the drum surface by utilizing a separation claw 22 which cooperates with an airstream, as will be described later. After the transfer step, the record sheet is conveyed along a guide plate 23 to be fed, by a pair of vertically spaced feed rollers 24, into a fixing unit 25 which includes a heater where the toner image is fused and fixed to the record sheet. Subsequently, the sheet is delivered onto a copy tray 27 by means of a pair of vertically spaced delivery rollers 26.

Any residue of toner which remains on the drum surface after the transfer step is removed by a rotating cleaning brush 28, which removed toner is withdrawn by an airstream created by a fan 29 to be collected in a filter 30. Both the cleaning brush 28 and the fan 29 are covered by a casing 31 in order to produce an effective withdrawal effect upon the toner residue and to prevent a dispersion of the toner into the apparatus. An airstream displaced by the fan 29 is introduced into a duct 32 having its outlet port 32*a* located adjacent to the transfer station 16, so that the airstream is effective to separate the record sheet from the drum 12 by cooperation with the separation claw 22.

The disclosed copying machine is designed so that an electrostatic latent image once formed on the drum surface may repeatedly be used to provide a plurality of copies in succession through a repeated process of developing with toner and image transfer. In this instance, the cleaning brush 28, which is mounted on a holding member 34 rotatably mounted on a support shaft 33, is moved away from the drum 12 and the neutralizing lamp 13 and the charger 14 are maintained inoperative.

Such copying machine is normally used to provide a copy or copies from a single sheet-shaped original, but can be operated to provide a copy from an original having an increased thickness such as a book in a manner to be mentioned below. Specifically, a follower roller unit 35 which is adapted to define an extension of a conveying path and including the upper conveyor rollers 4B, 5B, which are constructed as follower rollers, and also including the guide plate 6 is pivotally mounted on a pin 36 so as to be turned through 180° in a direction indicated by an arrow C. When so turned, these rollers and the guide plate 6 define an extension of the conveying path which is contiguous with the exposure station 8 and which is located above the original tray 9 (see FIG. 2).

A book carrier for placing a thick original can now be used. A book carrier having a thick original placed thereon is initially placed on the original receptacle 2, and is conveyed toward the exposure station 8 by means of conveyor rollers 4A, 5A, which act as drive rollers during a copying operation and which cooperate with their associated drive members. As the book carrier passes through the exposure station, the original is irradiated through a transparent plate 51 on which it is placed, whereby a copying operation takes place.

Referring to FIGS. 2 and 3, a book carrier and an associated conveyor unit will be described more specifically. A book carrier 50 comprises a rectangular transparent plate 51 of a relatively flexible material such as thin plastics on which a book or the like may be disposed with the surface of original to be copied placed in abutment against the transparent plate 51. The carrier also comprises a rectangular, tray-shaped support 52 having a bottom surface in the form of a picture frame on which the transparent plate 51 is centrally disposed in a detachable manner. The support 52 is lengthwise driven from a location on the original receptacle 2 toward the exposure station 8, by a drive member to be described later, during a copying operation. A substantially V-shaped book retainer 53 formed by resilient wire is disposed lengthwise in the central portion of the support 52, and has its opposite ends releasably mounted in a pair of detent holes formed in tabs 54 which are integral with each of the sideplates **52*b*, 52*b* of the support 52. The apex portion of the book retainer 53 is rotatably received in a holder 55 which is integrally formed on the support 52. In this manner, a book can be held between the wire and the transparent plate 51 in a condition such that the book lies against an inclined front bottomplate 52*a* of the support 52, which represents the front end of book carrier 50. When the book carrier 50 is used, the frame 35 is turned 180° in the direction of the arrow C (see FIG. 1) about the pin 36 to locate the conveyor rollers 4A, 5A, 4B, 5B, the guide plates 6, 7 and the exposure station 8 all exposed as mentioned previously. The guide plate 7 and the original receptacle 2 are formed with guide grooves 7*a*, 2*a* of a lower elevation than their associated central surfaces in order to facilitate guiding the book carrier 50. Disposed in one of the guide grooves 7*a* are a pinion 40 which represents a drive member for the book carrier and which is mounted on the same drive shaft 4C (see FIG. 3) as the conveyor rollers 4A, and another pinion 41, also representing another drive member, which is mounted on the same drive shaft as the conveyor rollers 5A. A pair of retainer plates 44 are secured to the upper surface of the sideplates 43, located outside of the guide grooves 7*a*, so as to extend horizontally over their respective guide grooves 7*a* so that they constrain the book carrier 50 from shifting upward as the latter reaches the location of these retainer plates 44**.

To permit free movement of the book carrier 50 while avoiding undesirable contact of its central lower surface with the original receptacle 2 when it is placed on the receptacle 2, both sideplates **52*b* of the support 52 have respective lower extensions which bear against the bottom surface of the guide grooves 2*a* formed on the opposite sides of the original receptacle 2. A pair of horizontal ledges 52*c* (see FIG. 3) are integrally formed with the lower end of each of the sideplates 52*b*, and that one of the ledges which is aligned with the pinions 40, 41 when the book carrier 50 is placed on the original receptacle 2 with the front bottomplate 52*a* facing the exposure station 8, is formed with a rack 56 (see FIG. 3) along its lower surface. The rack 56 represents a driven member which meshes with the pinions 40, 41 to feed the book carrier, and is arranged to avoid its abutment against the bottom surface of the guide grooves 2*a* formed in the original receptacle 2. A pair of ledges 52*d* are formed on the inside of each of the sideplates 52*b* of the book carrier 50, and grooves 57 (see FIG. 3) are formed therein so as to extend horizontally. The opposite lateral edges of the transparent plate 51 are detachably fitted into the grooves 57**.

In the conveying apparatus constructed as mentioned above, the follower rollers 4B, 5B which are mounted in the follower roller unit 35 together with the guide plate 6 must exhibit a frictional force of a suitable magnitude when the unit 35 is not deployed and the follower rollers are located opposite to the drive rollers 4A, 5A to convey a sheet-shaped original held therebetween. It is also necessary that a sheet-shaped original having an increased thickness can also be inserted into the nip between the rollers 4A, 5A and 4B, 5B. Accordingly, the unit is resiliently urged by a leaf spring 66, as shown in FIG. 1, so as to project above the original guide surface **6*a* of the guide plate 6**, as will be further discussed later.

However, when the follower roller unit 35 is deployed to the position shown in FIG. 2, and the carrier 50 is conveyed over the original guide surface **6*a* of the guide plate 6, the weight of the carrier inclusive of a book placed thereon or pressure applied thereto in order to obtain a frictional force of a suitable magnitude causes the follower rollers 4B, 5B to be depressed against the resilience of the leaf spring 66 to a point where the transparent plate 51 of the carrier 50 directly bears against the original guide surface 6*a* of the guide plate 6, resulting in a sliding contact therewith. Consequently, as the carrier 50 reciprocates repeatedly, the lower surface of the transparent plate 51 is rubbed against the original guide surface 6*a* to be damaged. Damages caused to the transparent plate 51** are also copied, resulting in a whitening of a black image area or letters becoming thin to degrade the image quality. In this manner, the copying performance is greatly degraded.

SUMMARY OF THE INVENTION

It is an object of the invention to eliminate described disadvantages by providing an original conveying apparatus including a holding member which is interlocked with a movement of a follower roller unit to its deployed position to maintain follower rollers in their projecting positions to prevent them from moving below an original guide surface.

In accordance with the invention, a holding member forcedly maintains follower rollers in their positions in which they project above an original guide surface, to prevent the follower rollers from moving below the original guide surface in response to a weight of a book carrier on which a book is placed. In this manner, the transparent plate of the book carrier on which an original is placed is prevented from making sliding contact with the original guide surface to thereby damage the transparent plate, resulting in a degraded copying function.

The holding member which maintains the follower rollers in their projecting positions is arranged to move in interlocked relationship with a movement of the follower roller unit to its deployed position. Hence, means which hold the follower rollers may be constructed in a very simple manner, thus overcoming the disadvantage of the prior art involved with a deployment of the follower roller unit.

DESCRIPTION OF THE PREFERRED EMBODIMENT

Figure 5:
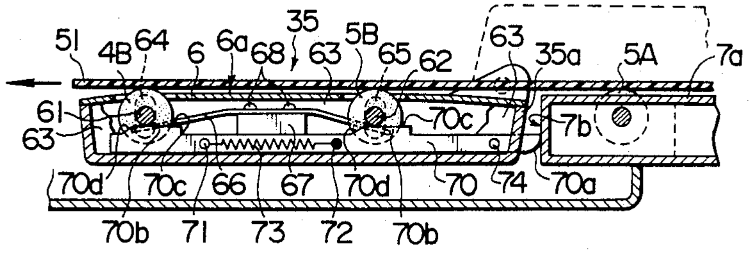
FIG. 5 is an elevational section of the original conveying apparatus of FIG. 4.
Figure 4:
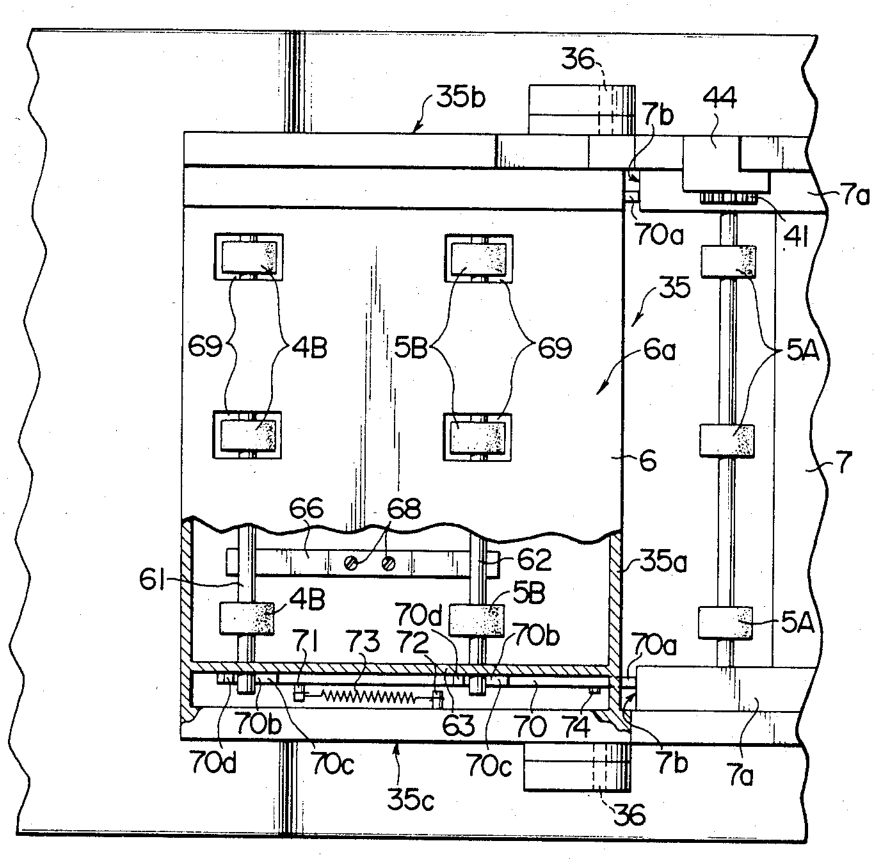
FIG. 4 is a plan view, partly cut away, of the original conveying apparatus according to one embodiment of the invention.

FIGS. 4 and 5 illustrate a follower roller unit 35 which is used in the original conveying apparatus of the invention. Specifically, the follower roller unit 35 is in the form of a flat box with follower rollers 4B, 5B rotatably mounted therein. The surface of the unit is covered by a guide plate 6 which represents an original guide surface **6*a* disposed in opposing relationship with an original. When the carrier 50 is utilized, the follower roller unit 35 is turned 180° about the pin 36 to its deployed position from its position shown in FIG. 1 so that the guide surface 6*a* lies in the same common horizontal plane as the guide surface of the guide plate 7, thus providing an extension for the conveying path of the original (see FIG. 2). As shown in FIGS. 4 and 5, the unit 35 is integrally formed with a pair of spaced, parallel support plates 63 rotatably carrying the opposite ends of support shafts 61, 62 associated with the follower rollers 4B, 5B, these support plates 63 being located inside the opposite sides 35*b*, 35*c* of the unit or the upper and lower sides thereof, as viewed in FIG. 4. The support shafts 61, 62 associated with these rollers are displaceably fitted in vertically elongated slots 64, 65 formed in the support plates 63. These shafts 61, 62 are urged upward, as viewed in FIG. 5, by the resilience of leaf springs 66 (only one being shown) which are secured, by means of set screws 68, to a pair of mounting members 67 (only one being shown) which are fixedly mounted on the bottom of the unit 35, relative to FIG. 5. However, the abutment of the shafts 61, 62 against the upper edge of the slots 64, 65** limits such movement.

The upper peripheral surface of the rollers 4B, 5B project above the guide surface **6*a* through square slots 69 (see FIG. 4) formed in the guide plate 6 as a result of the fact that the shafts 61, 62 are urged upward. Under the condition illustrated in FIG. 1 when a sheet-shaped original is used, the follower rollers 4B, 5B are brought into abutment under suitable pressure, against associated drive rollers 4A, 5A, thereby effectively providing a smooth conveying operation for the original. However, when this arrangement is used under the condition illustrated in FIG. 2 where the follower roller unit 35 is moved to its deployed position to provide an extension for the conveying path of the carrier 50, the weight of the thick original placed on the carrier 50 or a pressure which is manually applied thereto causes the rollers 4B, 5B to move down against the resilience of the leaf springs 66, whereby the transparent plate 51 of the carrier 50 may be urged into direct sliding contact with the guide surface 6*a* of the guide plate 6, resulting in damage to the transparent plate 51**.

In the apparatus of the invention, there are provided a pair of holding members 70 which are adapted to move along the support plates 63 and having projecting cam surfaces **70*b* which receive the shafts 61, 62 associated with the follower rollers, as illustrated in FIGS. 4 and 5. Each of the holding members 70 is in the form of an elongate strip member adapted to move in sliding contact with the lateral side of the bottom of the support plate 63. In its regions corresponding to the support shafts 61, 62, the upper surface of each holding member 70 is formed with the cam surface 70*b* including a gently inclined surface 70*d* and an elevated support surface 70*c* for the respective shafts 61 or 62 which is contiguous with the inclined surface 70*d*. The right-hand end, as viewed in FIGS. 4 and 5, of the holding members 70 extends through a right-hand sidewall 35*a* of the unit 35, with their free end surface 70*a* shaped into an arcuate form and bearing against a vertical wall 7*b* which defines the front end of the guide grooves 7*a* (see FIG. 2) of the carrier 50**.

The holding members 70 are urged to move to the right, relative to FIG. 5, by coiled tension springs 73 which extend between pins 71 fixedly mounted on the lateral side of the holding members 70 adjacent to their left-hand end, and pins 72 fixedly mounted on the inner wall of the unit 35. However, when the unit 35 is not moved to its deployed position (see FIG. 1), the resulting movement is limited by the abutment of a stop pin 74 fixedly mounted on the lateral wall of each holding member 70 adjacent to its right-hand end, against the right-hand sidewall **35*a* of the unit 35**.

Figure 1:
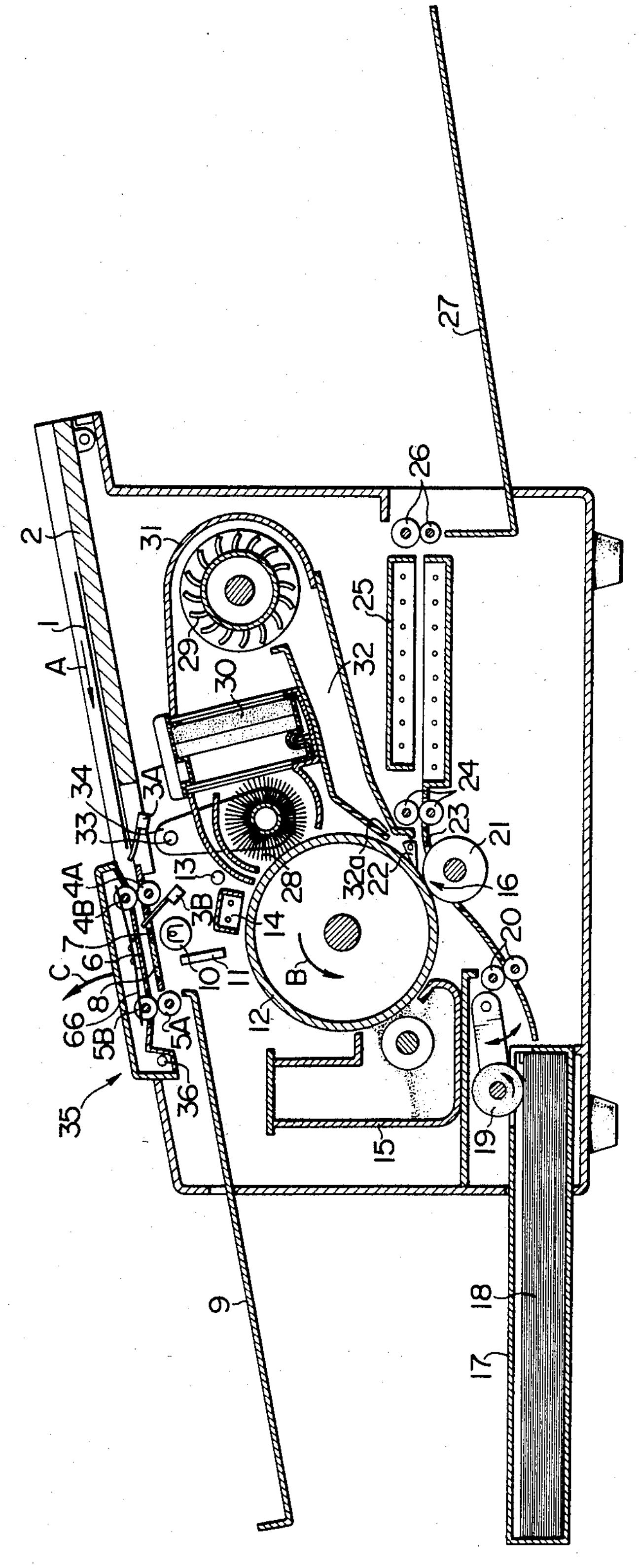
FIG. 1 is a schematic cross section of one form of an electrophotographic copying machine including a follower roller unit.
Figure 2:
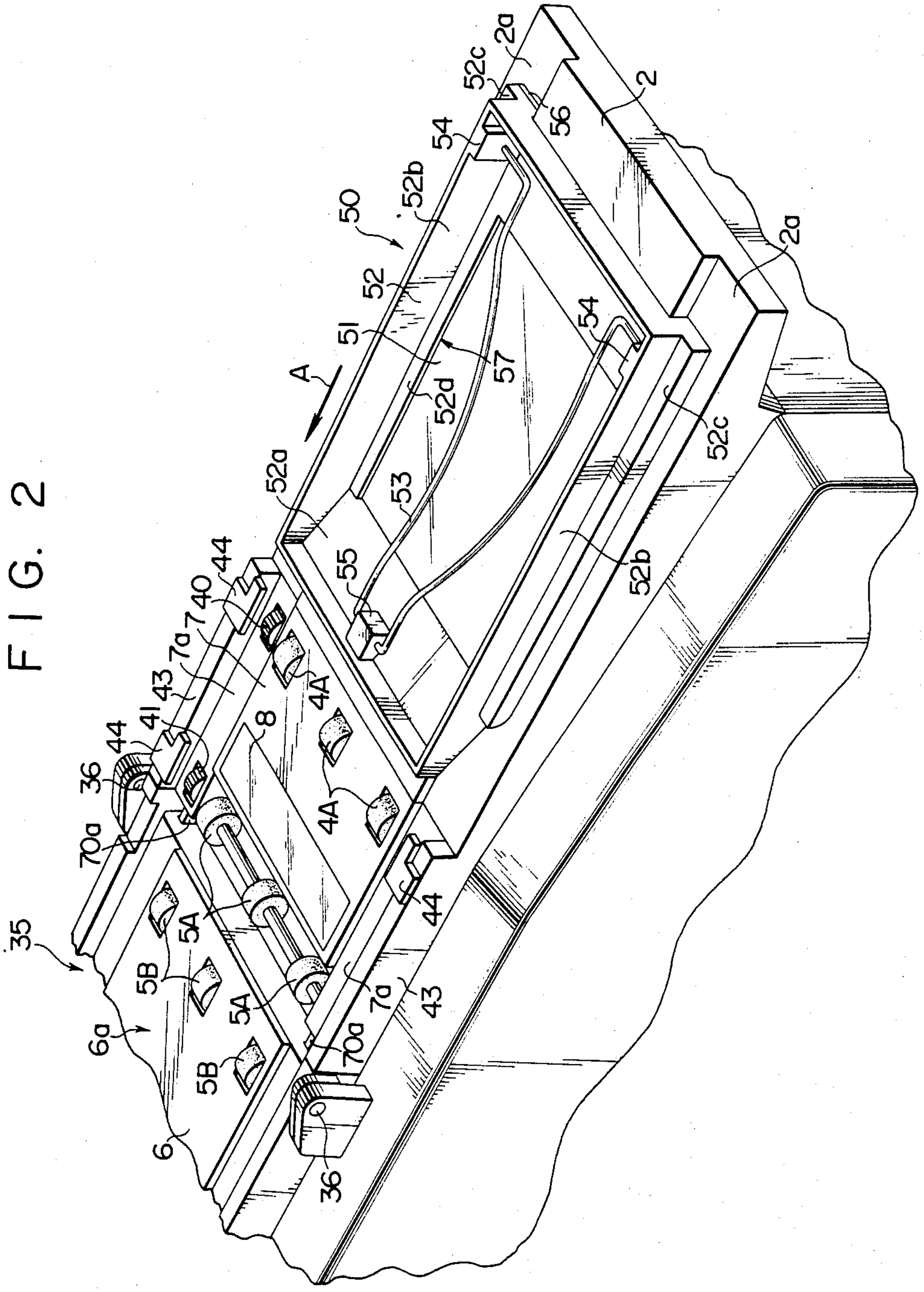
FIG. 2 is a perspective view of an original conveying apparatus used in the copying machine of FIG. 1 when the follower roller unit is moved to its deployed position to permit copying of a book, utilizing a book carrier.
Figure 3:
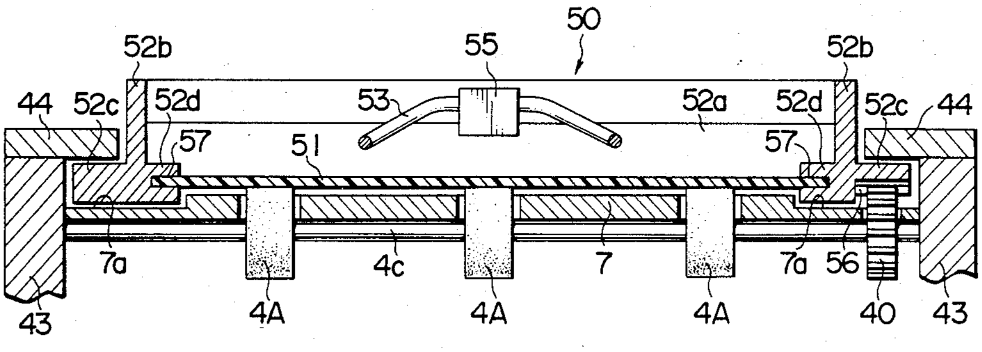
FIG. 3 is an enlarged cross section of essential parts of the original conveying apparatus shown in FIG. 2.

In the condition shown in FIG. 1 when the follower roller unit 35 is not moved to its deployed position or when a sheet-shaped original is used, it will be apparent from FIG. 5 that the right-hand end faces **70*a* of the holding members 70 cannot bear against the vertical wall 7*b* at the front end of the guide grooves 7*a*, and hence the holding members 70 move to the right, relative to FIG. 5, until the stop pins 74 bear against the right-hand sidewall 35*a* of the unit. Consequently, the cam surfaces 70*b* of the holding members 70 are disengaged from the shafts 61, 62 which are opposed by that area of the holding members 70 having a reduced elevation, and hence the shafts 61, 62 are raised by the leaf springs 66, relative to FIG. 5, causing the rollers 4B, 5B to project through the square openings 69. However, when the follower roller unit 35 is moved to its deployed position as indicated in FIG. 5 in order to permit the use of the carrier 50, the end faces 70*a* bear against the vertical wall 7*b* to cause the holding members 70 move to the left, whereby the support surfaces 70*c* of the cam surfaces 70*b* are brought in alignment with the roller shafts 61, 62 to raise them forcedly and support them. Accordingly, a downward movement of these shafts 61, 62 is prevented, maintaining the follower rollers 4B, 5B in their positions projecting above the guide surface 6*a*. Hence, the weight of the carrier 50 cannot cause downward movement of the follower rollers 4B, 5B when it has moved over the guide plate 6, allowing the rollers 4B, 5B to be maintained in their positions where they project above the guide plate 6 by a given elevation. As a consequence, a displacement of the transparent plate 51 of the book carrier 50 out of contact with the guide plate 6** prevents the transparent plate from being damaged.

While in the embodiment disclosed herein, the cam surfaces **70*b* of the holding members 70 are utilizied to prevent a downward movement of the follower rollers 4B, 5B, it should be understood that the invention is not limited thereto, but that a movement of the holding members 70 can also be achieved by utilizing electromagnets which can be energized through an electrical switch that is turned on and off in response to a movement of the follower roller unit 35** to its deployed position.

What is claimed is:

1. An original conveying apparatus for an electrophotographic copying machine of an original travelling type, comprising;

a drive roller unit;

a follower roller unit including an original guide surface for guiding an original being conveyed, which surface is adapted to be swingably moved between a first position cooperating with said drive roller unit for conveying a single sheet-shaped original therebetween and a second position for conveying an original having substantial thickness where the original guide surface is being deployed to provide an extension of an original conveying path on the upper surface of the copying machine, said follower roller unit including follower rollers which are movable below said guide surface and are resiliently cooperable with associated drive rollers of the drive roller unit which is provided on the copying machine, to convey the single sheet-shaped original in the first position and which are resiliently urged to partly project through said original guide surface;

a holding member slidably disposed within the follower roller unit to be displaceable between first and second positions in interlocked relationship with the movement of the follower roller unit for allowing the movement of the follower rollers when in the first position, and preventing said follower rollers from moving below said guide surface when in the second position, to forcibly maintain them in a non-resilient manner in said second position partly projecting above the guide surface for rollingly supporting an original having substantial thickness delivered to the follower roller unit by said drive roller unit;

said follower unit further including resilient bias means normally urging said holding member toward its first position; and a stationary surface for urging said holding member to its second position when said follower roller unit is moved to its second position.

2. An original conveying apparatus according to claim 1 in which the holding member is in the form of an elongated member disposed below a support shaft for the follower rollers and movable in a direction perpendicular to the axis of the support shaft, the holding member being formed with a projecting cam surface on a region of its upper surface where it opposes the support shaft and also carrying an end face disposed for abutment against said stationary surface, which comprises a wall of the copying machine to cause movement of the holding member when the follower roller unit is moved to its second position.

3. An orignal conveying apparatus according to claim 2 in which the projecting cam surface includes a gently inclined surface and an elevated support surface for the roller shaft which is contiguous with the inclined surface, the support surface being disposed in bearing relationship with the support shaft of the follower roller whenever the follower roller unit is moved to its second position.

4. An original conveying apparatus according to claim 2 in which the support shaft of the follower rollers is supported by a support plate so as to be vertically movable, the holding member being disposed for sliding movement along the support plate within the follower roller unit, the holding member being urged by said resilient bias means which comprises a spring extending between said holding member and a stationary part of the follower roller unit so that the projecting cam surface is moved to avoid abutment against the support shaft of the follower rollers whenever the follower roller unit is moved to its first position.

5. An orignial conveying apparatus according to claim 4 in which a free end of the holding member projects externally of the follower roller unit, the end face of the free end bearing against said stationary surface comprising a wall of the copying machine to cause a movement of the holding member against the spring whenever the unit is moved to its deployed position.

6. An apparatus according to claim 2 wherein said end face has an arcuate shape.

7. An apparatus according to claim 1 wherein said resilient bias means comprising spring means provided to resiliently mount said follower rollers relative to said follower roller unit.

8. An apparatus according to claim 1 wherein said follower rollers are mounted upon a resiliently mounted support shaft, said holding member being an elongated member having a cam surface along one edge comprised of first and second spaced parallel surfaces and a sloping surface extending between said first and second surfaces, whereby said first surface is beneath the support shaft when the follower roller unit is moved away from its second position and the second surface is beneath the support shaft when the follower roller unit is moved to its second position.

* * * * *